US005693352A

United States Patent [19]

Vogel Goodman

[11] Patent Number: 5,693,352

[45] Date of Patent: Dec. 2, 1997

[54] EGG DECORATING DEVICE

[76] Inventor: Deana L. Vogel Goodman, 2793 S. Uinta St., Denver, Colo. 80231

[21] Appl. No.: 711,862

[22] Filed: Sep. 12, 1996

[51] Int. Cl.[6] ........................ A23L 1/00

[52] U.S. Cl. ........................ 426/250; 426/298; 426/383; 118/13; 118/26; 118/406; 118/504; 118/505

[58] Field of Search ........................ 118/13, 26, 406, 118/504, 505; 426/250, 298, 383

[56] References Cited

U.S. PATENT DOCUMENTS

| | | | |
|---|---|---|---|
| 734,085 | 7/1903 | O'Mara et al. . | |
| 1,538,367 | 5/1925 | Young . | |
| 1,829,689 | 10/1931 | Townley et al. . | |
| 1,952,612 | 6/1934 | Sherwood . | |
| 3,848,564 | 11/1974 | Kull . | |
| 4,531,475 | 7/1985 | Thill . | |
| 4,798,162 | 1/1989 | Nelson . | |
| 4,967,687 | 11/1990 | McShane . | |
| 5,063,871 | 11/1991 | Chambers . | |
| 5,074,239 | 12/1991 | Law . | |
| 5,565,229 | 10/1996 | Mandle | 426/250 |

*Primary Examiner*—Laura Edwards
*Attorney, Agent, or Firm*—Ramon L. Pizarro; Edwin H. Crabtree

[57] ABSTRACT

A device and method for decorating an object such as an egg, which has a perimeter surface. The device includes a resilient band adapted for placement about the perimeter of the object to be decorated, the resilient band having a surface and at least one prominent, resilient area for masking. The resilient area for masking is mounted against the surface of the resilient band, so that the resilient band may be placed about the perimeter surface of the object, so that the resilient band will bias the resilient area for masking against the perimeter surface, so that the perimeter surface of the object may be immersed in a colorant, and thereby producing an image on the perimeter surface of the object by preventing colorant to reach the perimeter surface. The method includes providing a resilient band with prominent areas for masking. Then placing the resilient band about the perimeter area in a manner that allows the prominent areas to be biased against the perimeter surface, and then placing the perimeter area together with the resilient band into a bath of colorant.

16 Claims, 6 Drawing Sheets

EGG DECORATING DEVICE

BACKGROUND OF THE INVENTION

1. Field of the Invention

This invention generally relates to a device and a process for decorating the perimeter of objects, particularly for decorating objects having a generally rounded surface, and more particularly, but not by way of limitation, to a device for decorating eggs and the like.

2. Discussion of the Prior Art

The art of decorating eggs and similar round objects has been practiced for centuries. People have been decorating egg shaped objects, for example, as part of religious holidays or for creating fancy jewelry which is generally egg shaped. Thus the appeal for fancy or highly decorative ornamentation on eggs has been sought for centuries. The known methods and tools developed for achieving these decorations have generally taken similar approaches. Most of the known devices either produce random patterns or use complicated structure which does not lend itself to inexpensive fabrication and use.

For instance, an example of the known prior art includes U.S. Pat. No. 5,063,871 to Chambers, which teaches the use of an apparatus which holds and rotates the egg, or other rounded object, while a stencil pattern is placed over the surface of the object and transferred on to the object. The user must fix the egg within the device's structure, then attach a pattern to the structure, and then trace this pattern over the egg's surface. The user slowly rotates the egg as the pattern is transferred on to the egg's surface. The Chambers device, however, has limitations in that it is somewhat complicated and requires the slow, tedious transfer of the pattern on to the egg.

Another example of a device for decorating rounded objects such as eggs includes U.S. Pat. No. 4,798,162 to Nelson, which provides a pair of substantially oval segments with a diaphragm that is used to clamp the egg between the diaphragms. To transfer a design to the surface of the egg one would first place a masking pattern over the surface of the egg, and then clamp the masking pattern between the egg's surface and the diaphragms. The entire assembly is then immersed in a coloring fluid to transfer the negative image of the masking pattern on to the surface of the egg. While the Nelson patent provides an advancement in the art, it is disadvantaged in that it uses a double diaphragm arrangement that leaves a wide section, or seam, between the diaphragms which cannot support a pattern.

In yet another example of devices used for coloring rounded surfaces, U.S. Pat. No. 4,531,475 to Thill, approaches the problems associated with coloring eggs in a manner similar to the Nelson approach in that the Thill device uses a pair of covers that are used as templates to define the pattern to be transferred to the surface of the egg or rounded surface. Thus the complexities and disadvantages of this device are similar to those encountered with the Nelson device.

In yet another example, U.S. Pat. No. 3,848,564 to Kull, the problem of transferring a pattern on to the surface of an egg or the like is approached in a manner that is similar to the approach taken by Chambers. In other words, Kull provides an egg support structure on which the egg may be rotated. On the structure are mounted pattern stencils and makers or coloring means holding devices. The approach taken by Kull has the complexity disadvantages encountered with the Chambers device. Thus, while the Kull device allows the creation of patterns on the surface of the egg, it has disadvantages of complexity and expense. The large number of components required to manufacture the Kull device makes it very difficult to produce this device at a low cost.

Another approach at developing patterns and decorations on the surface of an egg or the like is taught in U.S. Pat. No. 1,952,612 to Sherwood. Sherwood teaches an article and the method for producing that article by means of dipping an egg in a coloring dye and then coating the surface of the egg with patterns of colored fibrous materials such as paper and the like. Thus the Sherwood invention allows one to produce ornate decorations on the egg, but is disadvantaged in that the pattern material or materials containing pictures to be placed on the surface of the egg are consumed by the process. Thus allowing the user to use the patterns only once.

Still another example of devices used to decorate eggs and the like is taught in U.S. Pat. No. 1,829,689 to Townley et al. The Townley device uses a dye resistant material to generate random markings of the surface of the egg. Thus when the egg is dipped in a coloring solution, the random masking pattern is brought out by the dye in the unmasked areas. The Townley, method, however does not provide a good method for transferring non-random, or ornate designs and figures on to the surface of the egg.

Similarly in U.S. Pat. No. 1,538,367 to Young a method for creating marbled patterns on the surface of an egg or the like is taught. The Young method uses membrane-like material such as the skin on an onion to coat the surface of the egg or the like before dipping the coated egg into a dye solution. This approach also has the disadvantage of producing only random designs, and thus does not allow the user to transfer figures or symbols such as letters and the like on to the surface of the egg.

Still yet another approach at transferring patterns on to the surface of a rounded object is U.S. Pat. No. 734,085 to O'Mara et al. The O'Mara invention teaches the use of opposing rubber dies attached to a mechanical clamp which pinches the rounded article between the dies, and thus masks the rounded article before immersing the article in a dye solution. This approach leaves problems of adequacy of coverage, in the event one has many patterns to be placed around the rounded surface, unanswered. Furthermore, the mechanical clamp can be difficult to control and prevent from damaging the surface of fragile rounded articles such as eggs.

Thus, a review of examples of the known prior art reveals that there remains a need for a simple, inexpensive device for decorating eggs. Importantly, there remains a need for a simple egg decorating device that can be easily used to fully decorate eggs with a variety of designs, whether they be simple or ornate.

Moreover, there remains a need for an egg decorating device that allows the novice to consistently produce aesthetically pleasing designs on a rounded object, without requiring special skills or talents to achieve optimal or desired results.

SUMMARY

It has been discovered that one can produce a device for decorating objects having a substantially rounded surface, such as an egg, by combining at least the following elements:

a) a resilient band having a surface; and b) at least one masking area of resilient material in the shape of a pattern to be transferred to the rounded surface. The area of resilient material being pressed against the rounded surface by the resilient band, thereby allowing one to submerge the rounded surface in a bath of colorant in order to produce an image on the rounded surface. The perimeter of the area of resilient material for masking can preferably include a raised sealing lip that ensures that a fluid tight seal is formed against the rounded surface.

The area, or areas, of resilient material for masking may be integral with the resilient band. Alternatively, these areas of resilient material may include a backing of hook and loop type material, a backing of adhesive material, buttons, loops or straps, or snap on type fastening structure which will allow the user to selectively attach areas of resilient material with different patterns or designs in order to vary the design produced with the device.

Additionally, at least one aperture may be included through the resilient band. This aperture may be a cutout of a specific pattern that will allow a user to place the resilient band about the rounded surface so that the aperture permits colorant to pass through said aperture and contact the rounded surface, thereby producing a positive image on the rounded surface. Also, this aperture reduces the stiffness of the resilient band, and thus reduces the distortion of the resilient areas for masking when the resilient band is stretched over an egg.

According to yet another aspect of the invention, a method for decorating the surface of an egg has been discovered. The method consists of the steps of providing a resilient band that includes resilient areas for masking, then placing the resilient areas for masking of the resilient band against the surface of the egg in a manner that allows the resilient band to press or urge the resilient areas for masking against the surface of the egg in order to secure a fluid tight masking of the egg's surface; and then placing the egg in a first bath of colorant, so that the masked areas are left uncolored when the egg is placed in the bath of colorant. The method may then include the step of removing at least some the masking areas and then placing the egg in a second bath of colorant, preferably of a different color than the first bath of colorant, so that selected areas of the egg that had been covered by areas for masking, as well as the rest of the egg's surface, may now be colored in the second bath of colorant. Clearly, the steps of the method may be repeated to create different patterns of different colors on the surface of the egg.

Thus the discovered egg coloring device and method offer advantages in ease of use, simplicity, and versatility that could not be achieved with known devices.

Moreover, the disclosed invention allows the user to create a myriad of designs and patterns, all around the egg or rounded article, with a simple immersion of the article together with the invention in a coloring bath.

It is contemplated that the device would be especially useful in the Easter tradition of decorating eggs. Decoration of eggs is a multi-age activity done by the very young to the elderly. The creation of beautifully decorated eggs is usually a time consuming, effort filled task requiring skill, dexterity, and patience. Thus, the disclosed invention offers advantages in permitting children, the elderly, and the physically and artistically challenged individual to use and to create beautifully decorated eggs or other three dimensional articles.

Therefore, by requiring a few resilient, preferably rubber, parts the instant invention solves problems of complexity associated with the known prior art.

Moreover, the instant invention solves problems associated with cost and versatility which were left unsolved by the known prior art.

While these and other advantages and objects of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
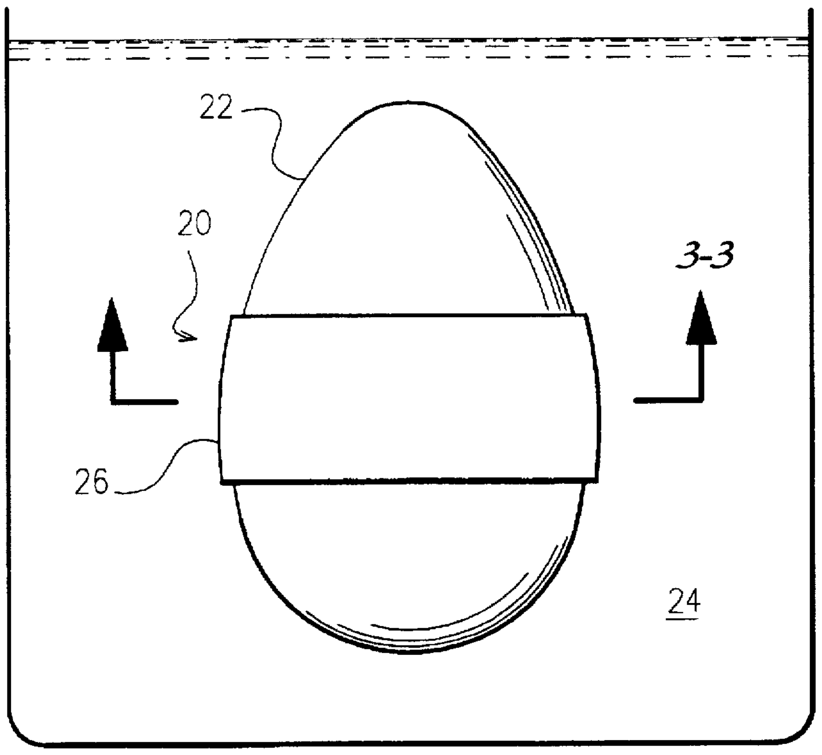
FIG. 1 shows an embodiment of the invention being used on an egg, while the egg is immersed in bath of colorant.

Turning now, to FIG. 1, which illustrates a preferred embodiment of a decorating device for decorating objects having a substantially rounded surface, such as an egg's shell, and which has been referred to, in general, as an egg decorating device 20. As has been illustrated in FIG. 1, the egg decorating device 20 can be placed over the surface of an egg 22, preferably over the shell of the egg, which can then be immersed in a colorant bath 24. The colorant bath 24 may be one of many well known dyes, but it is preferred that a food coloring that may be used at room temperature be used as the colorant bath 24. A room temperature food colorant offers distinct advantages in safety when using the invention to help children color eggs.

Figure 2:
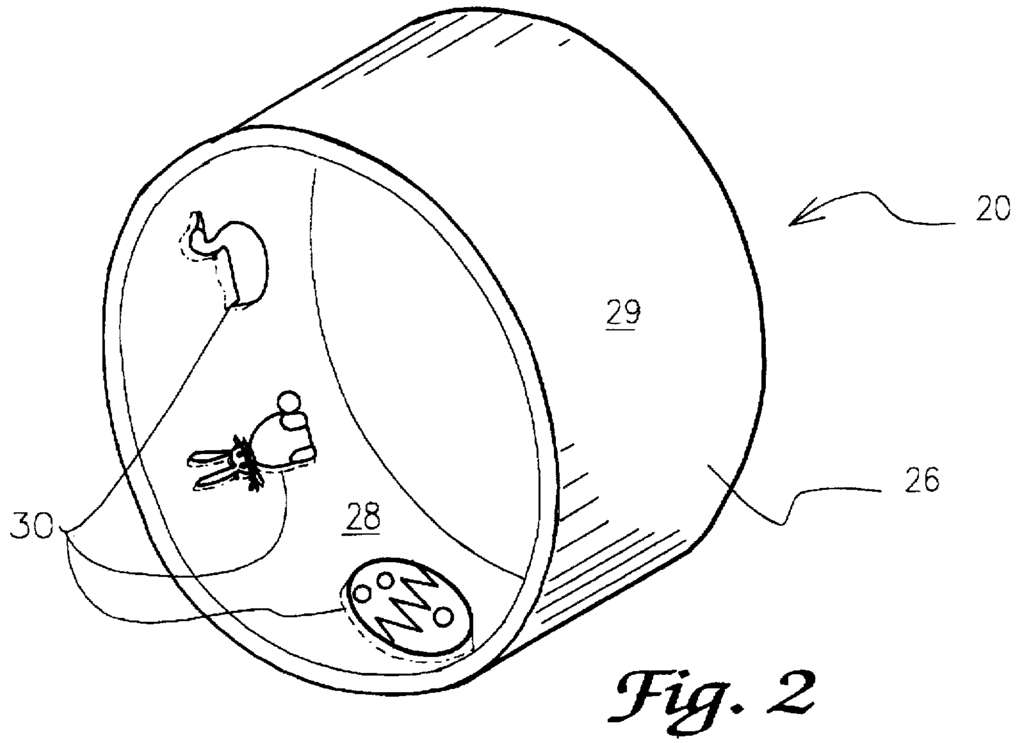
FIG. 2 is a perspective view of the invention, and reveals patterns on an inner surface of the invention.

Referring now to FIG. 2, it can be seen that the egg decorating device 20 includes a resilient band 26. The resilient band 26 is preferably sleeve shaped and has an inner surface 28, opposite an outer surface 29. On the inner surface 28 of the resilient band 26 is mounted at least one resilient means for masking. The resilient means for masking preferably includes at least one raised figure 30 which is made from a resilient material such as rubber and serves as a resilient means for masking. Thus, once the egg 22 together with egg decorating device 20 are immersed in the colorant bath 24, the raised figures 30 effectively mask the surface of the egg from the colorant 24, thereby leaving a negative image of the raised figure 30.

Figure 10:
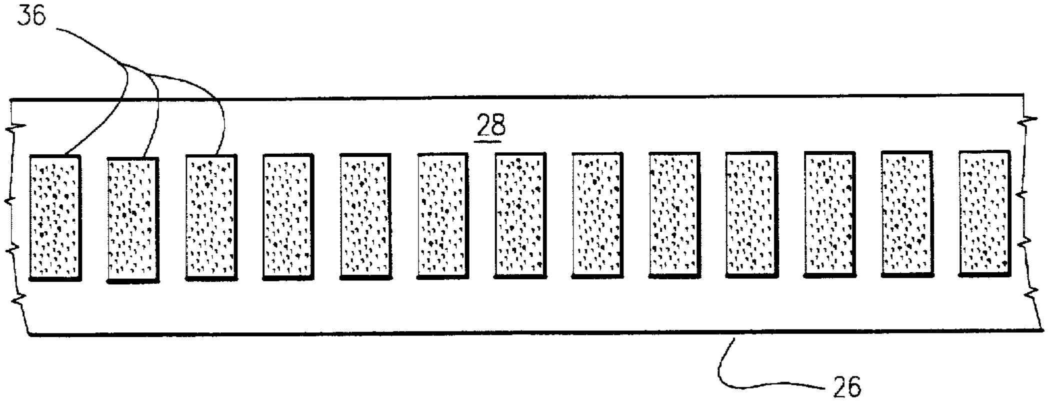
FIG. 10 is an unrolled view of an inner surface of the invention as illustrated in FIG. 9. The illustration shows hook and loop type attachment means on the inner surface of the device.
Figure 11:
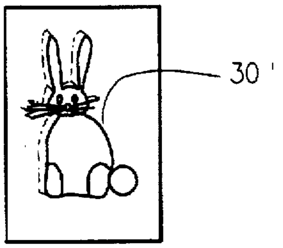
FIG. 11 shows an example of a removable image that can be used with the embodiment illustrated on FIG. 9.
Figure 12:
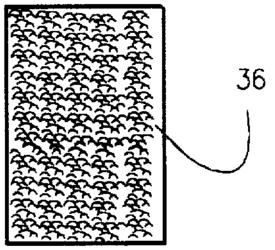
FIG. 12 shows the back side, containing hook and loop type material, on an example of a removable image that can be used with the embodiment illustrated on FIG. 9.

It should be noted, however, that while the preferred embodiment of the resilient band 26 includes a generally oval shaped resilient band, it is contemplated that the resilient band 26 may be made from a single flat band, similar to the band shown on FIG. 10. Thus the band would require hook and loop material on one surface and mating hook and loop type material on the opposite surface.

Figure 3:
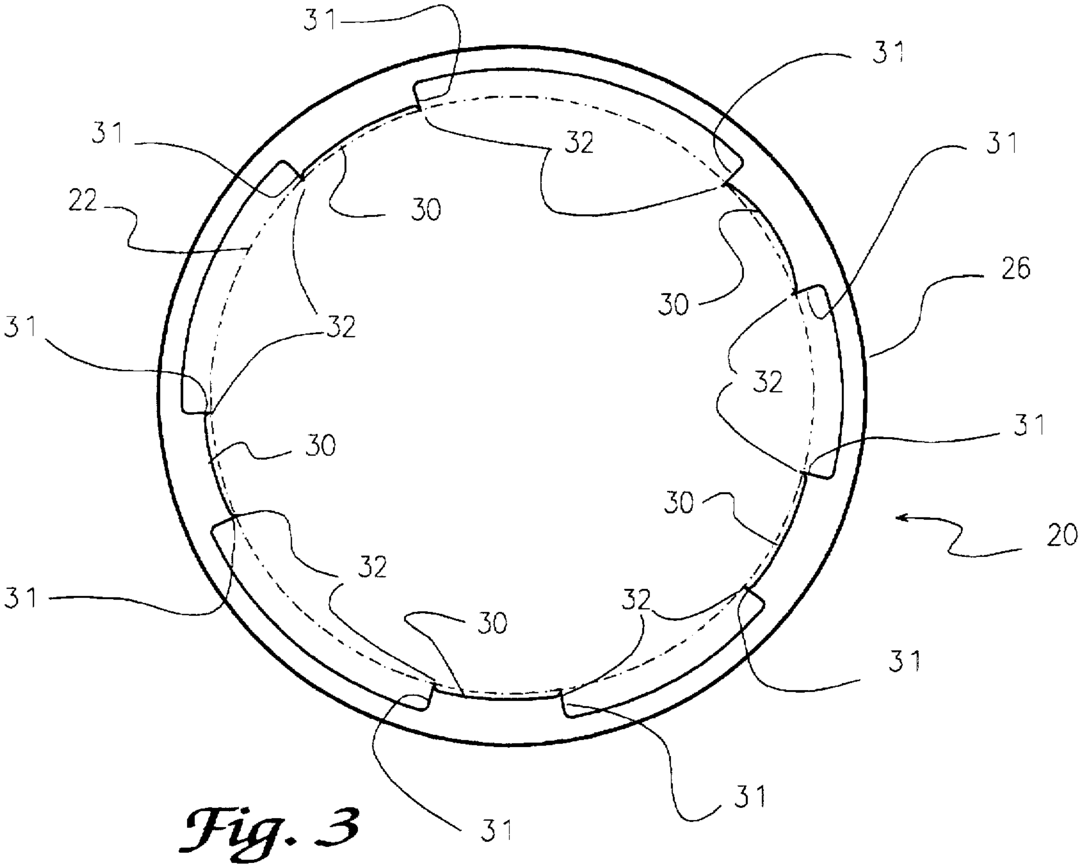
FIG. 3 is an end view of a section of the device. The section is taken from FIG. 1, through the patterns on the device, and shows the shell of an egg as a phantom line.
Figure 4:
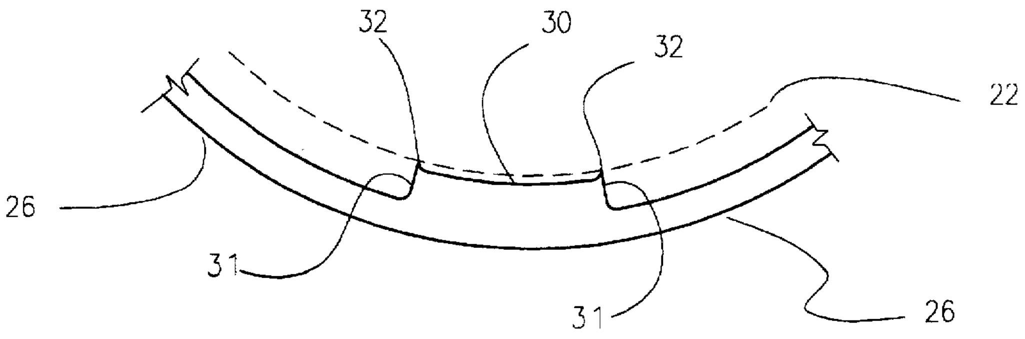
FIG. 4 is an enlargement of a section through one of the patterns. The enlarged detail shows that the pattern includes raised sealing ridges that keep the colorant off of the egg in order to create a negative image on the egg's shell.
Figure 5:
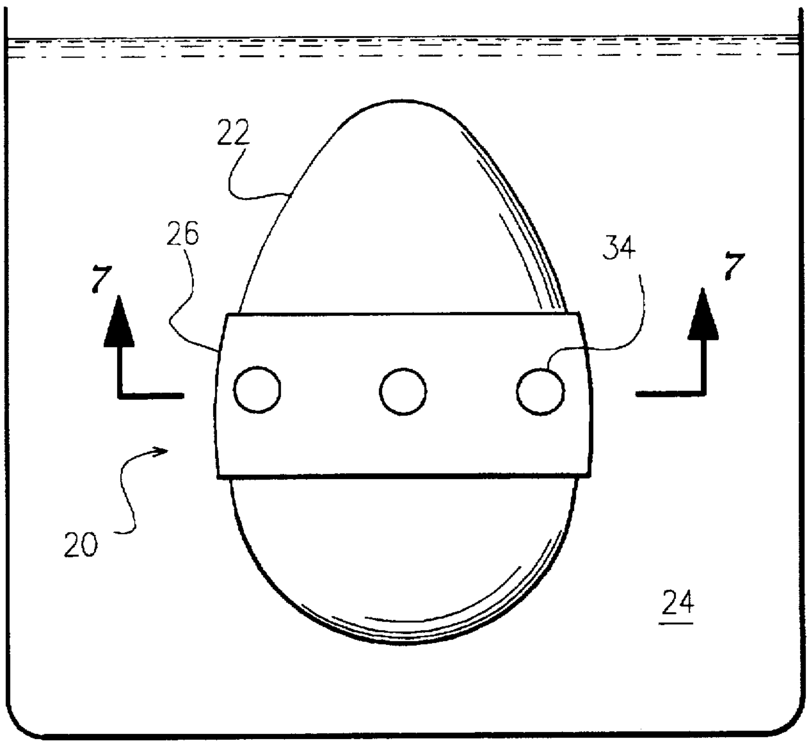
FIG. 5 shows another embodiment of the invention, the embodiment having images that are raised and images that are stencil type images, the device being used on an egg while the egg is immersed in bath of colorant.
Figure 6:
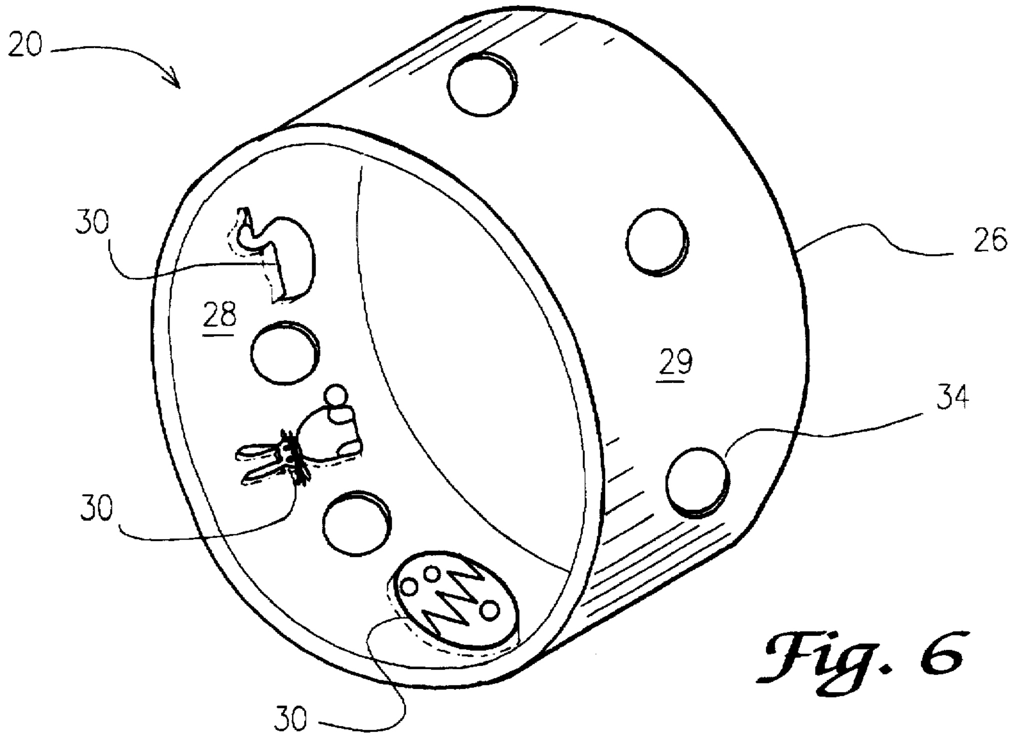
FIG. 6 is a perspective view of the invention, and reveals patterns on an inner surface of the invention, as well as stencil type images.
Figure 7:
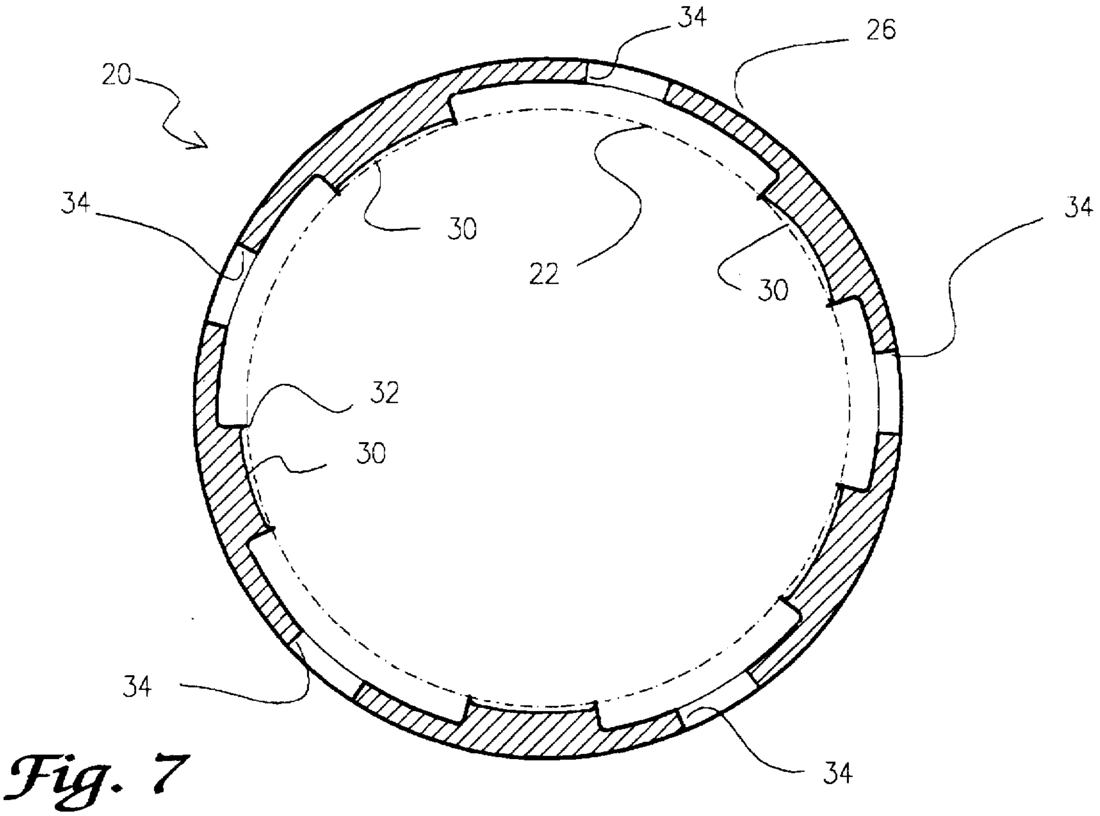
FIG. 7 is an end view of a section of the device. The section is taken from FIG. 1, through raised and stencil type patterns on the device, and showing the shell of an egg as a phantom line.
Figure 8:
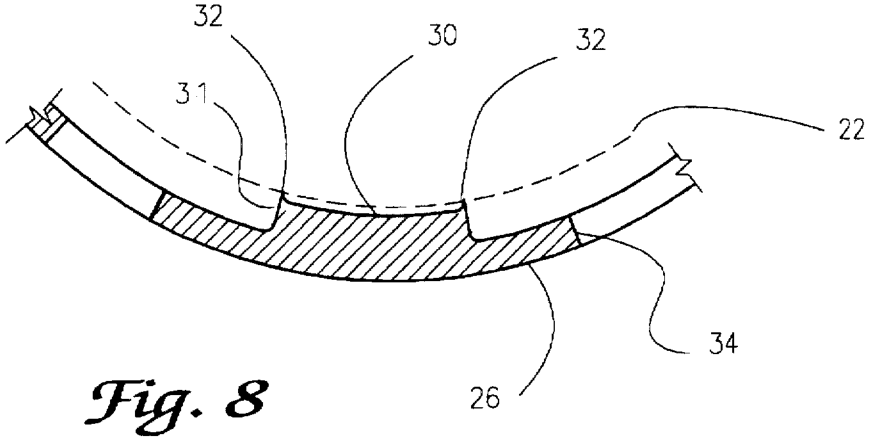
FIG. 8 is an enlarged portion of the section shown on FIG. 7
Figure 9:
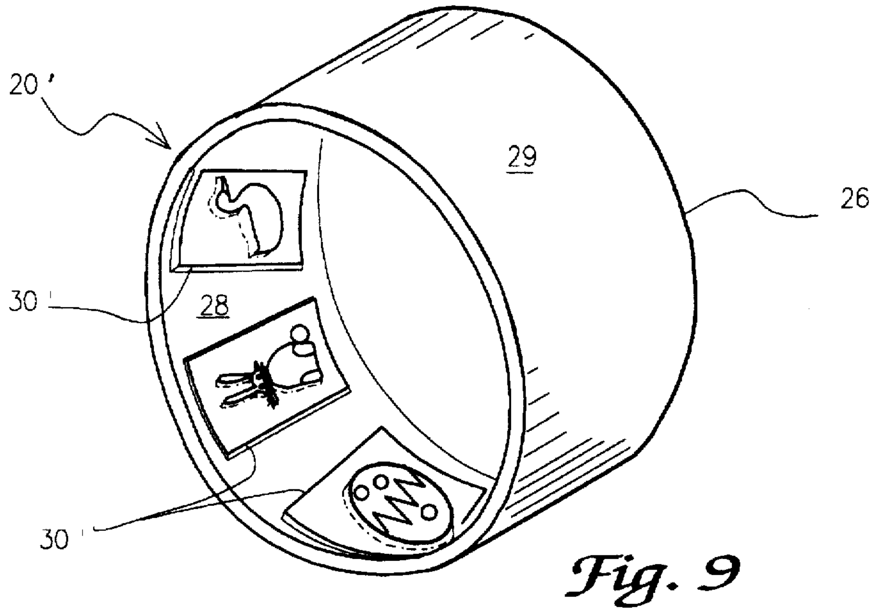
FIG. 9 is a perspective view of another embodiment of the invention, the embodiment having removable images.

As is illustrated in FIGS. 2–3, each raised figure 30 preferably includes a perimeter 31 with a raised sealing means along the perimeter 31. The sealing means is preferably a raised lip 32, which is made from a soft resilient material and has a generally triangular cross-section. This configuration allows integral, inexpensive, fabrication of the entire egg decorating device 20 by a molding process.

It is preferred that the resilient band 26 include several raised figures 30 along the inner surface 28, so that when the resilient band is placed over the egg 22, the resilient band 26 will bias the raised figures 30 against the egg's rounded surface, providing a secure seal of the raised figures against the rounded surface of the egg 22. By biasing, or pressing, the raised figures 30 against the rounded surface of the egg 22, the egg coloring device 20 effectively seals off, or masks, the areas underneath the raised figures 30. Thus, is to be understood that if the raised figures should be made of a sufficiently pliable, resilient, material such that the bias of the resilient band 26 presses the raised figures 30 against the surface of the egg 22, will effectively allow the raised figures 30 to mask patterns on the surface of the egg 22.

Also, since the perimeter 31 of a preferred embodiment of the instant invention 20 includes the raised lip 32, which serves as a raised sealing means for securing a seal against the substantially rounded surface of the egg 22. This also promotes proper masking when making the raised figures 30 on irregular surfaces.

It is important to note that the stiffness of the resilient material raised figures 30, as well as the stiffness of the resilient band 26, should be carefully considered. It has been discovered that the raised figures 30 may be integral to the resilient band 26. However, to achieve optimal masking of images on the rounded surface, the raised figures should be made of an impermeable material of a sufficient thickness so as to minimize the distortion of the raised figure 30 as the resilient band 26 is stretched about the rounded surface of the egg 22.

It has been discovered that, for an embodiment that includes raised figures 30 that are integral with the resilient band 26, the raised figures 30 should be at least about fifteen percent thicker than the thickness of the resilient band 26, and preferably about twice the thickness of the resilient band 26. It has been found that these ratios of thicknesses minimize the distortion of the figures as the band is stretched over the egg 22.

Moreover, it has been discovered that by making the resilient band 26 out of an impermeable material such as rubber, one may also incorporate one or more apertures that may also be used as stencil patterns 34 as shown on FIGS. 4–8. Preferably these apertures, or stencil patterns 34, will be incorporated between the raised figures 30, so that positive images may be created on the surface of the egg 22, or on another substantially rounded surface, when immersed in colorant. It is important to note that it is contemplated that one may fabricate a device that can benefit from the advances taught here by simply fabricating a resilient band that includes only stencil patterns 34 and no raised figures. Also, while the stencil patterns 34 have been shown as circles, it is contemplated that these may be made of any desired outline. However, in making the stencil patterns 34, one should keep in mind that it is not desirable to include overhanging, or unsupported, features which do not receive a bias force from the resilient band pressing the feature against the egg 22. This design guideline is directed at providing designs that ensure that the colorant does not seep into past areas that are supposed to be masked.

Importantly, it will be appreciated by those skilled in the art that by including stencil patterns 34, or apertures, on the resilient band 26 at locations between the raised figures 30 one may effectively reduce the stiffness of the resilient band 26 in the areas between the raised figures 30. By reducing the stiffness in these areas one effectively reduces the resilient band's 26 tendency to distort the raised figures 30 as the resilient band 26 is stretched over the surface of the egg 22 or other rounded surface.

It is clear that it is desirable to provide a resilient band 26 which is made of a soft resilient rubber material in order to prevent the breaking of the shell of the egg. The rubber material should be chosen to provide the needed bias pressure to kept the raised figures 30 against the shell of the egg without breaking the shell. However, a new and unexpected result of the stencil patterns 34 has been that they also serve to control the stiffness of the resilient band. One may add more and larger stencil patterns 34 between the raised figures 30 in order to lower the overall stiffness of the resilient band 26, instead of having to formulate special soft rubber compositions that meet the precise needed stiffness.

As shown on FIGS. 9–12, it is also contemplated that another embodiment of the instant invention would include adhesion means 36, which serves as a means for attaching individual raised figures 30'to the inner surface 28 of the resilient band 26. As shown on FIG. 10, it is contemplated that these adhesion means 36 include mechanical fastening means such as hook and loop type material, button shaped projections, loops or straps for accepting the resilient band, or snap type fasteners, as well chemical attachments such as a tacky reusable adhesive, adhesive substance such as is commonly used with peel away protective backing or on devices which contain reusable sticky surfaces used to remove lint, dust, or the like from clothing. The adhesion means 36 can be used advantageously to vary the pattern produced with this embodiment of the invention 20'. Clearly, one may use the resilient band 26 to hold figures against the rounded surface of the egg in order practice the instant invention. However, it is highly preferred that when using several figures 30' on the inner surface 28 of the resilient band 26, one may use the means for attaching the figures 30' to create a pattern to be transferred to the surface of the egg 22, in other words, to be easily organized and designed before immersing the egg 22 together with the invention 20' into the bath of colorant 24.

Figure 13:
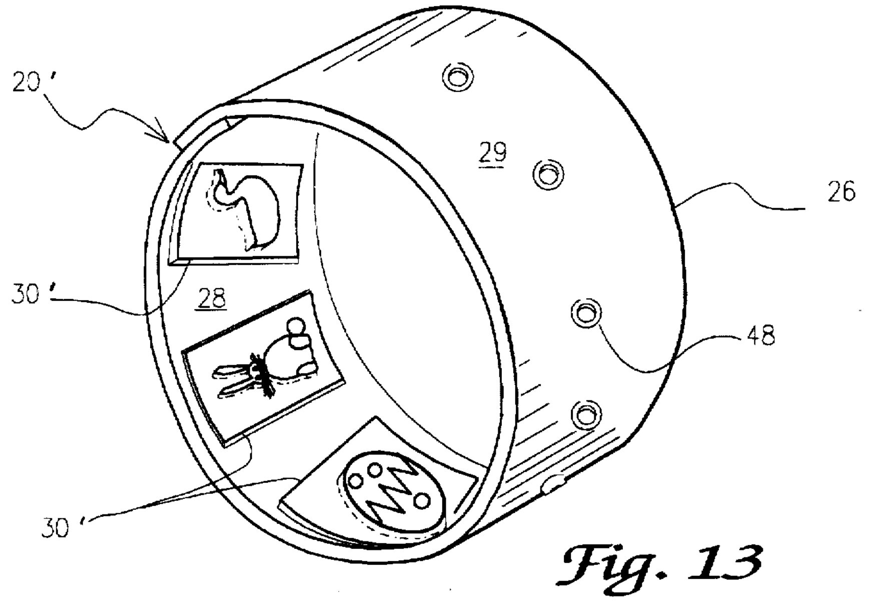
FIG. 13 is a perspective view of yet another embodiment of the invention, the embodiment having an adjustable strap and removable images that attach by means of a snap or button like fastening means.
Figure 14:
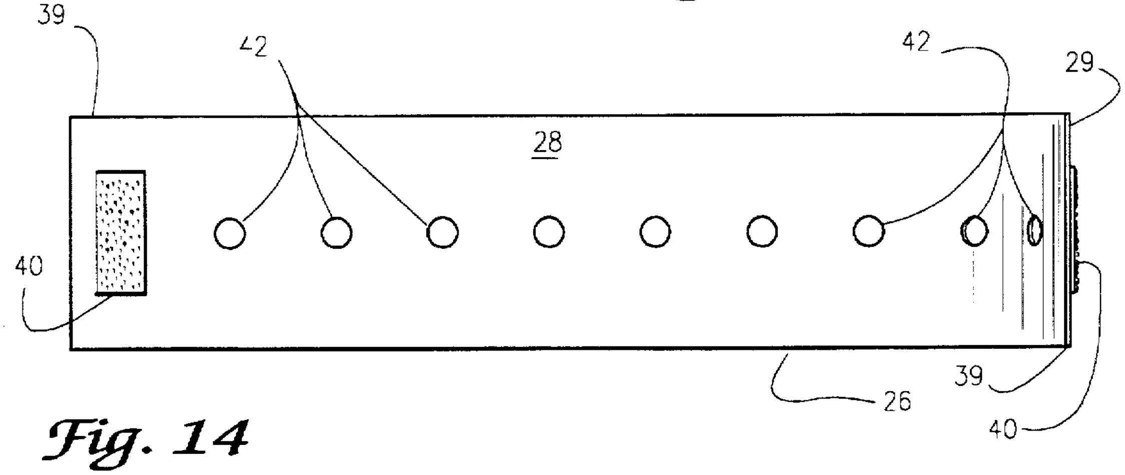
FIG. 14 is a view of an inner surface of the invention as illustrated in FIG. 13, the adjustable resilient band being unrolled. The illustration shows the female receivers that serve as attachment means on the inner surface of the device.
Figure 15:
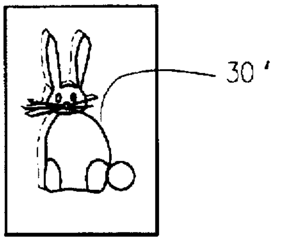
FIG. 15 shows an example of a removable image that can be used with the embodiment illustrated on FIG. 13.

Turning now to FIGS. 13–17 where yet another embodiment of the invention has been shown and referenced with the numeral 20' This embodiment includes a resilient band 26 which has ends 39, and can be adjusted by means of mating clasping means near ends 39. As shown in FIG. 14, it is contemplated that these clasping means be made of mating hook and loop sections 40. One of the mating hook and loop sections 40 being placed on the inner surface 28 near the end 39 of the band 26 and the other mating hook and loop section 40 being placed on the outer surface 29 near the end 39 of the resilient band 26.

As shown in FIGS. 13 through 17, the figures 30' are removably attached to resilient band 26 by means of a snap or button like fastening means. As shown in FIGS. 13 and 14, the adjustable resilient band 26 includes female receivers 42 that cooperate with male protrusion 46 on the raised image 30' in order to provide means for attaching means for masking, or the raised image 30', against the surface 28 of the resilient band 26.

Figure 16:
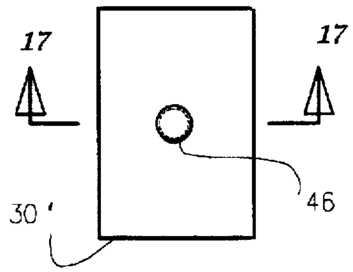
FIG. 16 shows the back side, containing a male protrusion which fits into the female receivers shown on FIGS. 13 and 14, and serve as the attachment means for attaching the figures into the embodiment of the resilient band illustrated on FIG. 13.
Figure 17:
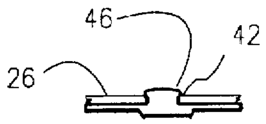
FIG. 17 is a section taken from FIG. 16, through the male protrusion and a figure having a raised perimeter, the view taken looking in the direction indicated on FIG. 16.

As shown in FIG. 16 the male protrusion 46 which fits into the female receivers 42 is preferably very much like the male portion found in the well known snap type fastener. Accordingly, as shown in FIG. 17 the male protrusion 46 and the raised figure 30' is shown cooperating with the female receivers 42 in a manner much like a snap type fastener or a button and button hole. Also, as shown in FIG. 13 it is advantageous to include a stiffened area 48 around the female receivers 42 in order to provide enhanced gripping of the male protrusion 46.

It can be appreciated from the foregoing that it is advantageous to incorporate an adjustable feature such as the clasping means 40 of mating hook and loop type material to the resilient band 26. The adjustability of the resilient band will allow the user to further adjust the pressure imposed by the resilient band 26 on the raised figures 30 or 30', so that different size eggs can be accommodated without running the risk of breaking the shell of large eggs and obviating the problems of insufficient pressure on the shell of small eggs.

Also, by attaching the raised figures 30' to the inner surface 28 of the resilient band 26 by adhesion means 36, or with other attachment means, such as the male and cooperating female attachment means illustrated in FIGS. 13 through 17, the user may vary the patterns and designs created on the egg 22 or the surface along the perimeter of an object. Therefore, while in a highly preferred embodiment of the invention 20 the raised figures 30 are integral to the inner surface 28 of the resilient band 26, it is also recognized that it is advantageous to removably attach the raised figures 30', or masking means, to the inner surface of the resilient band 26 by means of adhesion means 36. This allows the user to vary the patterns produced on the surface of the egg 22. Thus, by varying the patterns on the shell of the egg, the instant invention provides a system that allows the user to spell his or her name on the surface of the egg as well as decorate and vary the patterns used on the surface of the egg.

It should also be noted that by incorporating apertures 34 into the resilient band 26 between areas with raised figures 30 allows the resilient band 26 to be used to create positive images by placing the outer surface 29 of the resilient band 26 directly over the surface of the egg 22. A positive image, as used herein, means a figure which is formed by the deposition of colorant on the surface of the egg 22, whereas a negative image is an image formed by keeping colorant away from the surface of the egg 22. Thus by incorporating apertures 34 on the resilient band 26 one may create stenciled, positive, images on the surface of the egg 22, once the egg 22 and the device 20 is immersed in the colorant 24.

Thus it is clear that according to another aspect of the invention a method for decorating the surface of an egg 22 has been discovered. The method includes the steps of first providing a resilient band 26 having areas for masking. As discussed earlier, these areas for masking may be positive raised figures 30 or apertures for providing stencil patterns. The preferred next step is placing the areas for masking or stencil patterns which have been placed against or attached to the resilient band 26 against the surface of the egg 22. This step should preferably be followed by the step of placing the egg 22 in a bath of colorant 24, so that the resilient band 26 will bias the areas for masking against the surface of the egg 22, and so that areas of the egg 22 that are covered by areas for masking are left uncolored when the egg 22 is placed in the bath of colorant.

It is also contemplated that after the egg 22 with the invention 20 has been immersed in the colorant 24, one may remove at least part of the resilient band 26 from the surface of the egg 22 and then place the egg in a second bath of colorant, so that areas of the egg that were covered by areas for masking when the egg 22 was immersed in the first bath may now be colored by the colorant in the second bath. Clearly, the method may include the step of removing the resilient band 26 and then replace the raised patterns or stencil areas and repeat the steps of immersing the egg in a bath of colorant, but varying the color of the colorant. Thus, by repeating the steps taught here one may layer and vary the color of the patterns created on the egg by simply changing the bands, patterns and colorant.

In light of the above, it is clear that it is also contemplated that a resilient band 26 including apertures 34, or stencil patterns for creating positive images, may also be used to create positive patterns on the surface of the egg 22 by immersing the egg 22 in a first bath of colorant while the outer surface 29 of the resilient band is against the surface of the egg 22. Then by removing the resilient band 26 and immersing the egg 22 in a second bath of colorant one may achieve decorations of different colors on the surface of the egg 22.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A device for decorating an object having a perimeter surface, the device comprising:

a band for circumferential placement about the perimeter about the perimeter of the object to be decorated, the band having a surface;

at least one resilient means for masking, the resilient means for masking being mounted against the surface of the band, so that the band may be placed about the perimeter surface of the object, so that the band will bias said resilient means for masking against the perimeter surface so that the perimeter surface of the object may be immersed in a colorant, and thereby producing an image on the perimeter surface of the object by preventing colorant to reach the perimeter surface.

2. A device according to claim 1, wherein said band is made from an impermeable material.

3. A device according to claim 2, and further comprising:

at least one aperture through said band, so that the aperture permits colorant to pass through the aperture and contact the perimeter surface of the object, thereby producing a positive image on the perimeter surface of the object.

4. A device according to claim 2 wherein said resilient means for masking further comprises a raised sealing means for securing a seal against the perimeter surface of the object.

5. A device according to claim 4 wherein said resilient means for masking is integral with said band.

6. A device according to claim 1 and further comprising at least one means for attaching said resilient means for masking to the surface of said band.

7. A device according to claim 1 wherein said the surface of said band further comprises at least one means for attaching means for masking to the surface of said band and said means for masking further comprises means for attaching said means for masking the surface of said band.

8. A device according to claim 1 wherein said the surface of said band further comprises at least one means for removably attaching means for masking to the surface of said band and said means for masking further comprises means for removably attaching said means for masking to the surface of said band.

9. A device according to claim 7 wherein said resilient means for masking further comprises a perimeter having a raised sealing means for securing a seal against the perimeter surface of the object.

10. A device for decorating a shell on a egg, the device comprising:

a resilient band having an inner surface and an outer surface, said resilient band being for circumferential placement of the band over the shell of the egg;

at least one resilient means for masking the shell of the egg on the inner surface of the resilient band, so that said resilient band may be placed circumferentially about the shell of the egg, so that the resilient band will bias said resilient means for masking against the egg's shell, so that the shell of the egg may be immersed in a colorant, and thereby producing a negative image having an outline defined by said resilient means for masking.

11. A device according claim 10, wherein said resilient band is made from an impermeable material.

12. A device according to claim 11 wherein said resilient means for masking is integral with said resilient band.

13. A device according to claim 12 wherein said resilient means for masking further comprises a perimeter having a raised sealing means for securing a seal against the substantially rounded surface.

14. A device according to claim 13, and further comprising:

at least one aperture through said band, so that said aperture permits colorant to pass through said aperture and contact the substantially rounded surface, thereby producing a positive image on the substantially rounded surface.

15. A method for decorating a surface of an egg, comprising the steps of:

providing a resilient band having areas for masking, the resilient band reserving for circumferential placement over the shell of the egg;

placing the areas for masking of the resilient band against the surface of the egg; and placing the egg in a first bath of colorant, so that the resilient band will bias the areas for masking against the surface of the egg, so that areas of the egg that are covered by areas for masking are left uncolored when the egg is placed in the bath of colorant.

16. A method for decorating the surface of an egg according to claim 15 and further comprising the steps of:

removing at least part of the resilient band having areas for masking; and placing the egg in a second bath of colorant, so that areas of the egg that are covered by areas for masking are left uncolored when the egg is placed in the bath of colorant.

* * * * *